US010562517B2

(12) United States Patent
Shin

(10) Patent No.: US 10,562,517 B2
(45) Date of Patent: Feb. 18, 2020

(54) SYSTEM AND METHOD OF CONTROLLING DRIVING OF VEHICLE WHEN BATTERY CHARGING IS LIMITED

(71) Applicants: Hyundai Motor Company, Seoul (KR); Kia Motors Corporation, Seoul (KR)

(72) Inventor: Dong Jun Shin, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 227 days.

(21) Appl. No.: 15/651,411

(22) Filed: Jul. 17, 2017

(65) Prior Publication Data

US 2018/0162360 A1 Jun. 14, 2018

(30) Foreign Application Priority Data

Dec. 13, 2016 (KR) .................. 10-2016-0169571

(51) Int. Cl.
*B60W 20/14* (2016.01)
*B60W 10/06* (2006.01)
(Continued)

(52) U.S. Cl.
CPC ............ *B60W 20/14* (2016.01); *B60W 10/02* (2013.01); *B60W 10/06* (2013.01); *B60W 10/08* (2013.01);
(Continued)

(58) Field of Classification Search
None
See application file for complete search history.

(56) References Cited

U.S. PATENT DOCUMENTS

2009/0105924 A1* 4/2009 Kamichi .............. B60L 50/16
701/99
2014/0172211 A1 6/2014 Kim
(Continued)

FOREIGN PATENT DOCUMENTS

KR 2014-0079158 A 6/2014
KR 10-1558812 B1 10/2015
KR 10-1583976 B1 1/2016

*Primary Examiner* — Thomas G Black
*Assistant Examiner* — Demetra R Smith-Stewart
(74) *Attorney, Agent, or Firm* — Mintz Levin Cohn Ferris Glovsky and Popeo, P.C.; Peter F. Corless

(57) ABSTRACT

A method of controlling driving of a vehicle when battery charging is limited is provided. The method includes calculating a target wheel torque from a speed of the vehicle, calculating a target motor torque from a differential gear device of the vehicle, and calculating a discharge power of a hybrid starter generator when the target motor torque and a motor charging limitation torque are compared with each other and the target motor torque is greater than the motor charging limitation torque. A fuel injection of the vehicle is blocked and an engine clutch is disengaged when the discharge power of the hybrid starter generator and a discharging limitation power of the hybrid starter generator are compared with each other and the discharge power of the hybrid starter generator is less than the discharging limitation power of the hybrid starter generator. Additionally, an engine reference speed of the vehicle is determined.

20 Claims, 4 Drawing Sheets

(51) Int. Cl.
*B60W 10/02* (2006.01)
*B60W 10/08* (2006.01)
*B60W 20/40* (2016.01)
*B60W 20/10* (2016.01)
*B60W 20/13* (2016.01)
*B60W 20/00* (2016.01)

(52) U.S. Cl.
CPC ............ *B60W 20/10* (2013.01); *B60W 20/13* (2016.01); *B60W 20/40* (2013.01); *B60W 20/00* (2013.01); *B60W 2510/0638* (2013.01); *B60W 2510/081* (2013.01); *B60W 2510/083* (2013.01); *B60W 2510/1005* (2013.01); *B60W 2520/10* (2013.01); *B60W 2520/30* (2013.01); *B60W 2710/021* (2013.01); *B60W 2710/0627* (2013.01); *B60W 2710/0644* (2013.01); *B60W 2710/083* (2013.01); *B60Y 2200/92* (2013.01); *Y02T 10/6286* (2013.01); *Y10S 903/93* (2013.01); *Y10S 903/946* (2013.01)

(56) References Cited

U.S. PATENT DOCUMENTS

| | | | |
|---|---|---|---|
| 2015/0239464 A1* | 8/2015 | Ando | ................... B60K 6/445 701/22 |
| 2016/0059848 A1 | 3/2016 | Kim et al. | |
| 2016/0082942 A1 | 3/2016 | Park | |

* cited by examiner

SYSTEM AND METHOD OF CONTROLLING DRIVING OF VEHICLE WHEN BATTERY CHARGING IS LIMITED

CROSS-REFERENCE TO RELATED APPLICATION

This application is based on and claims the benefit of priority to Korean Patent Application No. 10-2016-0169571, filed on Dec. 13, 2016, in the Korean Intellectual Property Office, the disclosure of which is incorporated herein in its entirety by reference.

TECHNICAL FIELD

The present invention relates to a system and a method of controlling the driving of a vehicle when battery charging is limited, and more particularly, to a technique for controlling a deceleration sensation of a vehicle when battery charging is limited.

BACKGROUND

The electric vehicles that have been developed recently are capable of being driven using the power of a battery. The electronic vehicle types include a pure electric vehicle that uses only battery power, and a hybrid vehicle using battery power and a traditional internal combustion engine together. The pure electric vehicle is driven by the power of a driving motor operated by battery power, and the hybrid vehicle is driven by efficiently combining the power of an internal combustion engine and the power of a driving motor.

In a hybrid vehicle, the battery charging power is limited to prevent a battery from being overcharged when the state of charge (SOC) of the battery is full while traveling downhill. In particular, to limit the battery charging power, the hybrid vehicle may be driven in an electrical vehicle (EV) mode among a plurality of driving modes capable of discharging the battery, or may allow an engine to output power that corresponds to a driver request (e.g., torque requested by a driver) to minimize the charging of the battery.

SUMMARY

The present invention provides a system and method of controlling driving of a vehicle when battery charging is limited, which is capable of generating electricity using a motor that corresponds to deceleration of a vehicle to implement deceleration feeling or sensation when the vehicle is decelerated and the battery charging is limited. A hybrid starter generator (HSG) is driven with the extra electric power of the motor when an engine clutch is disengaged, and the deceleration feeling or sensation (e.g., engine speed control) of the vehicle is implemented by driving using a frictional loss (torque) and an engine pumping loss (torque). The technical problems to be solved by the present inventive concept are not limited to the aforementioned problems, and any other technical problems not mentioned herein will be clearly understood from the following description by those skilled in the art to which the present disclosure pertains.

According to an aspect of the present invention, a method of controlling driving of a vehicle when battery charging is limited may include calculating a target wheel torque from a speed of the vehicle, calculating a target motor torque from a differential gear device of the vehicle, calculating a discharge power of a hybrid starter generator when the target motor torque and a motor charging limitation torque are compared with each other and the target motor torque is greater than the motor charging limitation torque, prohibiting a fuel injection of the vehicle and disengaging an engine clutch when the discharge power of the hybrid starter generator and a discharging limitation power of the hybrid starter generator are compared with each other and the discharge power of the hybrid starter generator is less than the discharging limitation power of the hybrid starter generator, and determining an engine reference speed of the vehicle.

The target wheel torque may be calculated from a traveling speed of the vehicle and is a torque value requested to a target wheel. The calculating of the target motor torque may include calculating a gear ratio from the differential gear device, a final gear ratio, and the target wheel torque, and multiplying the calculated gear ratio, the calculate final gear ratio, and the calculated target wheel torque. The motor charging limitation torque may be calculated using a difference between a current motor charging limitation torque value and a preset motor charging torque reference value.

In addition, the calculating of the discharge power may include calculating the discharge power by subtracting vehicle electric power from a value obtained by multiplying the target motor torque, a motor speed (RPM) and $2\pi/60$. The calculating of the discharging limitation power of the hybrid starter generator may include calculating the discharging limitation power of the hybrid starter generator using a difference between a current value of the discharging limitation power of the hybrid starter generator and a preset reference value of the discharging limitation power of the hybrid starter generator.

Further, the disengaging of the engine clutch may include outputting the discharge torque of the hybrid starter generator while disengaging the engine clutch. The discharge torque of the hybrid starter generator may be calculated by dividing a discharge power currently output from the hybrid starter generator by a value obtained by multiplying a speed (RPM) of the hybrid starter generator and $2\pi/60$. The engine reference speed may be a speed at which the output power of the hybrid starter generator is equilibrated with an engine friction power. The method may further include determining an engine compensation speed after the determining of the engine reference speed.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
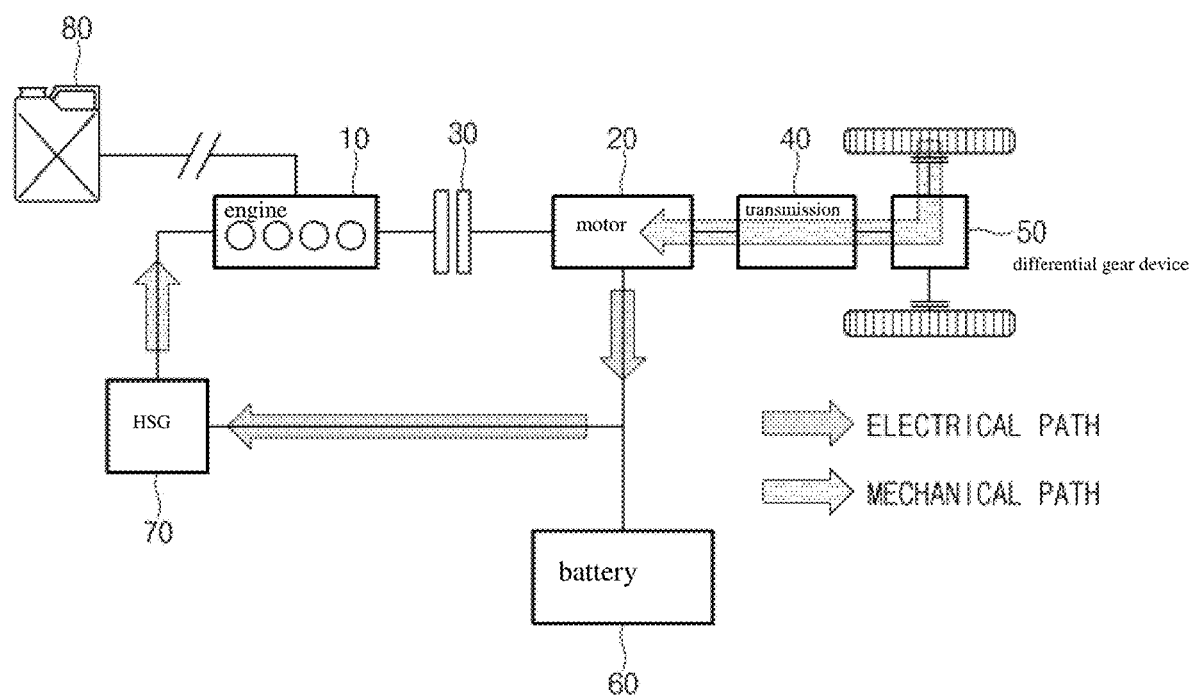
FIG. 1 is a schematic view illustrating an electric vehicle to which a method of controlling the driving of a vehicle when battery charging is limited is applied, according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Various advantages and features of the present invention and methods accomplishing them will become apparent from the following description of exemplary embodiments with reference to accompanying drawings. However, the present invention is not limited to the exemplary embodiments described herein but may be embodied in other forms. The exemplary embodiments are provided so that those skilled in the art may easily carry out the technical idea of the present invention. In the drawings, the exemplary embodiments of the present invention are not limited to the specific forms shown and are exaggerated for the sake of clarity. Although specific terms are used herein, it is to be understood that the same is by way of illustration and example only and is not to be taken by way of limitation with the scope of the appended claims.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Hereinafter, exemplary embodiments of the present invention will be described in detail with reference to accompanying drawings. A hybrid vehicle may include a hybrid control unit (HCU) configured to execute the overall operation of the hybrid vehicle, an engine control unit (ECU) configured to operate an engine, a motor control unit (MCU) 120 configured to operate a motor, a transmission control unit (TCU) configured to operate a transmission, and a battery control unit (BCU) configured to operate and manage a battery.

FIG. 1 is a schematic view illustrating an electric vehicle to which a method of controlling the driving of a vehicle when battery charging is limited is applied, according to an exemplary embodiment of the present invention. Referring to FIG. 1, an apparatus for controlling driving of a vehicle when battery charging is limited may include an engine 10, a motor 20, an engine clutch 30 that interrupts power between the engine 10 and the motor 20, a transmission 40, a differential gear device 50, a battery 60, and a hybrid starter generator (HSG) 70 configured to start the battery 60 and the engine 10 or generate electricity by the output power of the engine 10.

In particular, to realize a deceleration feeling or sensation while a hybrid vehicle is decelerated in a battery charging limitation state of the hybrid vehicle, the motor 20 may be configured to generate electricity that corresponds to the deceleration of the hybrid vehicle. When the battery 60 is charged to a target charging amount, the battery 60 may not be fully charged and fuel is not injected the fuel injecting unit 80 to the hybrid vehicle. When the engine clutch 30 is disengaged (e.g., opened), the HSG 70 may be driven by extra electricity of a motor and thus, the deceleration feeling of the vehicle (engine speed control) may be implemented using an engine friction loss (torque) and an engine pumping loss (torque).

Figure 2:
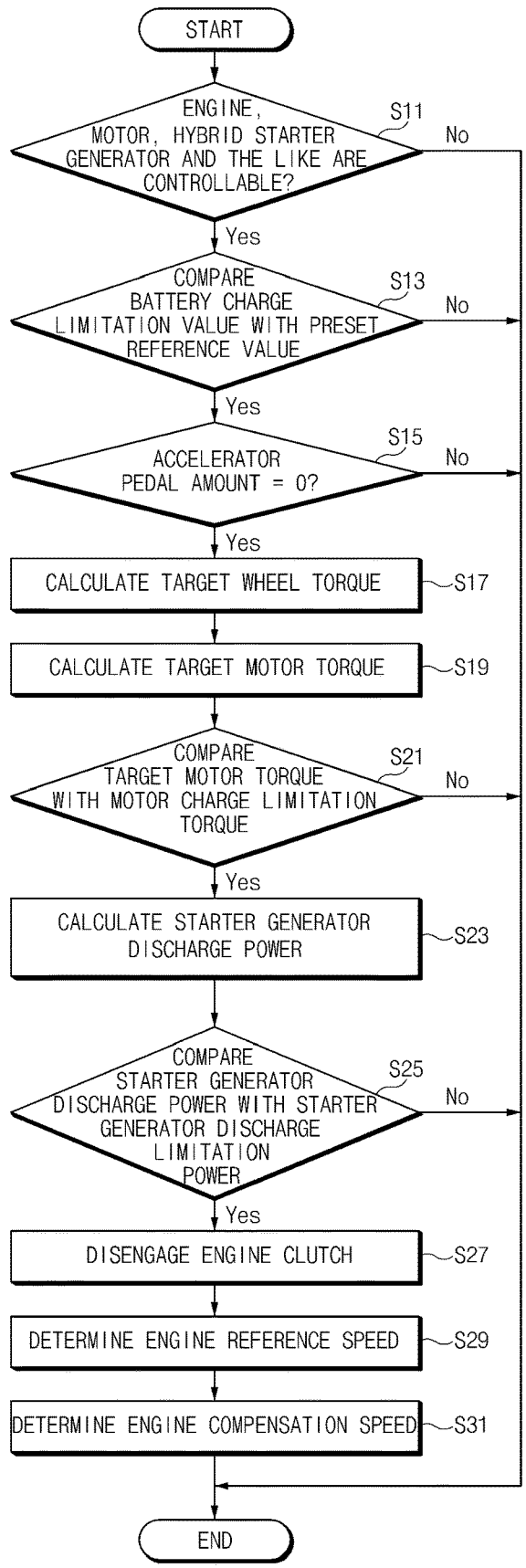
FIG. 2 is a flowchart illustrating a method of controlling the driving of a vehicle when battery charging is limited, according to an exemplary embodiment of the present invention.
Figure 3A:
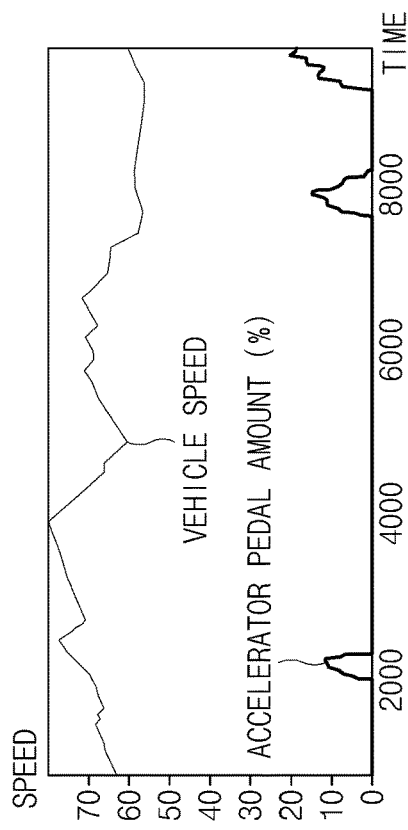
FIG. 3A to 3D are views illustrating a prediction regarding a control result of using a method of controlling the driving of a vehicle when battery charging is limited according to an exemplary embodiment of the present invention.
Figure 3B:
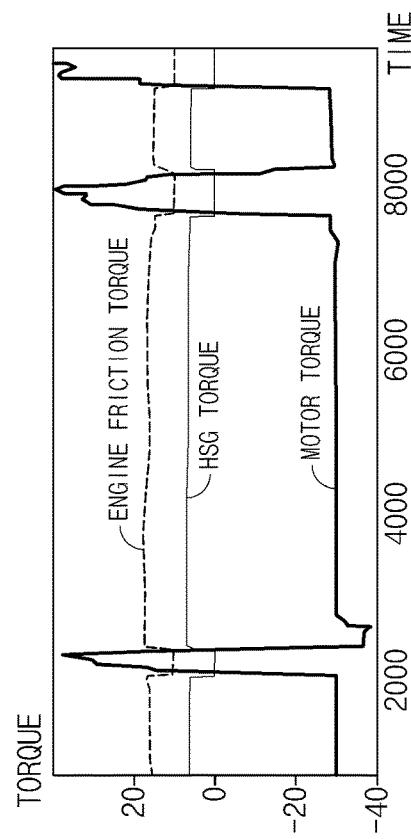
Figure 3C:
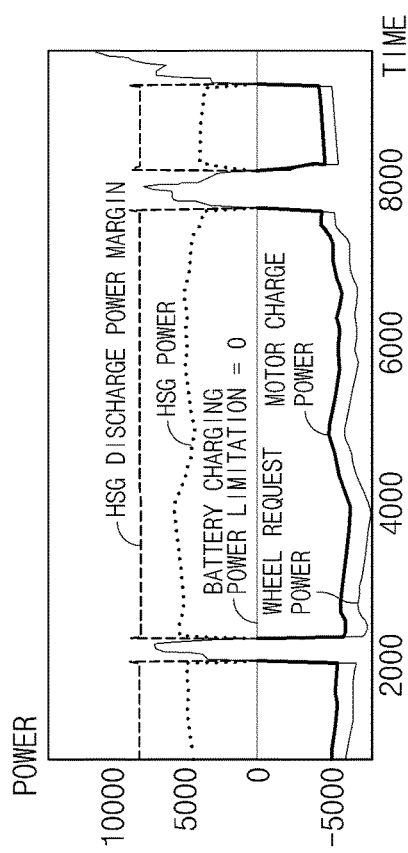
Figure 3D:
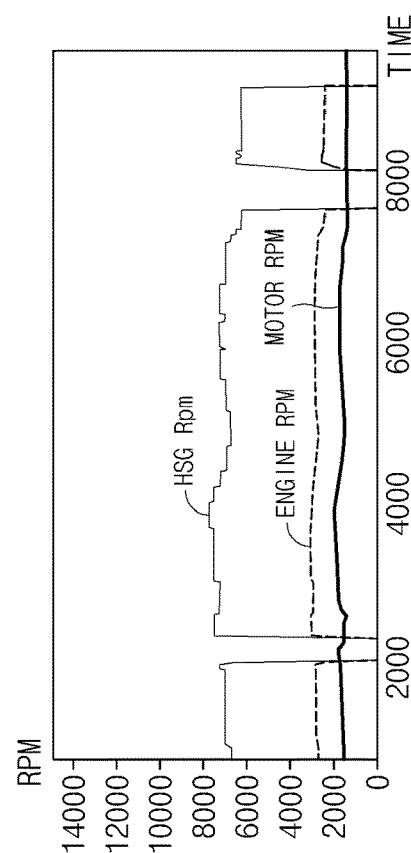

FIG. 2 is a flowchart illustrating a method of controlling the driving of a vehicle when battery charging is limited, according to an exemplary embodiment of the present invention. The method may be executed by a controller having a processor and a memory. Referring to FIG. 2, in operation S11, when battery charging is limited, a driving control apparatus may be configured to determine whether the engine, the motor, the hybrid starter generator, and the like are operable. Then, in operation S13, the driving control apparatus may be configured to compare a battery (e.g., high-voltage battery) charging limitation value with a preset reference value.

Then, in operation S15, when the battery charging limitation value is less than the preset reference value, the driving control apparatus may be configured to determine whether a value of an accelerator pedal amount is 0 (e.g., whether the accelerator pedal is engaged). In operation S17, the driving control apparatus may be configured to calculate a target wheel torque. In particular, the target wheel torque may be calculated from a traveling speed of the vehicle and is a torque value requested to a target wheel for the deceleration of the vehicle. Additionally, in operation S19, the target motor torque may be calculated. In particular, the target motor torque may be calculated by calculating a gear ratio from the differential gear device, a final gear ratio, and the target wheel torque, and multiplying the calculated gear ratio, the calculate final gear ratio, and the calculated target wheel torque.

Further, in operation S21, the driving control apparatus may be configured to compare the target motor torque and a motor charging limitation torque with each other. The motor charging limitation torque may be calculated by using a difference between a current motor charging limitation torque value and a preset motor charging torque reference value. In operation S23, when the target motor torque is greater than the motor charging limitation torque, the driving control apparatus may be configured to calculate the discharge power of the hybrid starter generator. Particularly, the discharge power of the hybrid starter generator may be calculated by subtracting vehicle electric power from a value obtained by multiplying the target motor torque, a motor speed (RPM) and $2\pi/60$.

In operation S25, the driving control apparatus may be configured to compare the discharge power of the hybrid starter generator and a discharge limitation power of the hybrid starter generator with each other. The discharging limitation power of the hybrid starter generator may be calculated using a difference between a current value of the discharging limitation power of the hybrid starter generator and a preset reference value of the discharging limitation power of the hybrid starter generator.

When the discharge power of the hybrid starter generator is less than the discharging limitation power of the hybrid starter generator, the driving control apparatus may be configured to prohibit or block the fuel injection and disengage the engine clutch. In addition, the driving control apparatus may be configured to output the discharge torque of the hybrid starter generator while prohibiting the fuel injection and disengaging the engine clutch. The discharge torque of the hybrid starter generator may be calculated by dividing a discharge power currently output from the hybrid starter generator by a value obtained by multiplying a speed (RPM) of the hybrid starter generator and $2\pi/60$.

Then, in operation S29, the driving control apparatus may be configured to determine the engine reference speed. The engine reference speed is a speed at which the output power of the hybrid starter generator is equilibrated with the engine friction power. In operation S31, the driving control apparatus may be configured to determine the engine compensation speed. The engine compensation speed may be determined by adjusting a throttle position sensor (TPS) and the like to decrease the engine speed to a minimum engine speed that satisfies the discharge torque of the hybrid starter generator. Accordingly, the vehicle may then be driven based thereon.

FIG. 3A to 3D is a view illustrating a prediction regarding a control result of using a method of controlling the driving of a vehicle when battery charging is limited according to an exemplary embodiment of the present invention. Referring to FIGS. 3A to 3D, the driving control apparatus of the vehicle may be configured to compare the power, speed, torque, and the like over time with each other when the vehicle is driven. That is, the power, speed, and torque may be detected by a sensor over a particular period of time and may then be compared to each other. As the amount of the accelerator pedal increases at the moment the driver engages on the accelerator (e.g., as the engagement amount increases or the amount of pressure exerted onto the pedal increases), various powers including the hybrid starter generator power, the motor charging power, and the wheel demand power increase. Further, in the section where the amount of the accelerator pedal is increased, the hybrid starter generator speed and the engine speed are decreased, and the motor torque is increased. In other words, the vehicle driving control apparatus satisfies the driver request torque without engaging and disengaging the engine clutch after increasing the motor torque when the driver request torque increases, thereby reducing the sense of heterogeneity due to acceleration and deceleration of the vehicle in terms of driving performance.

Figure 4:
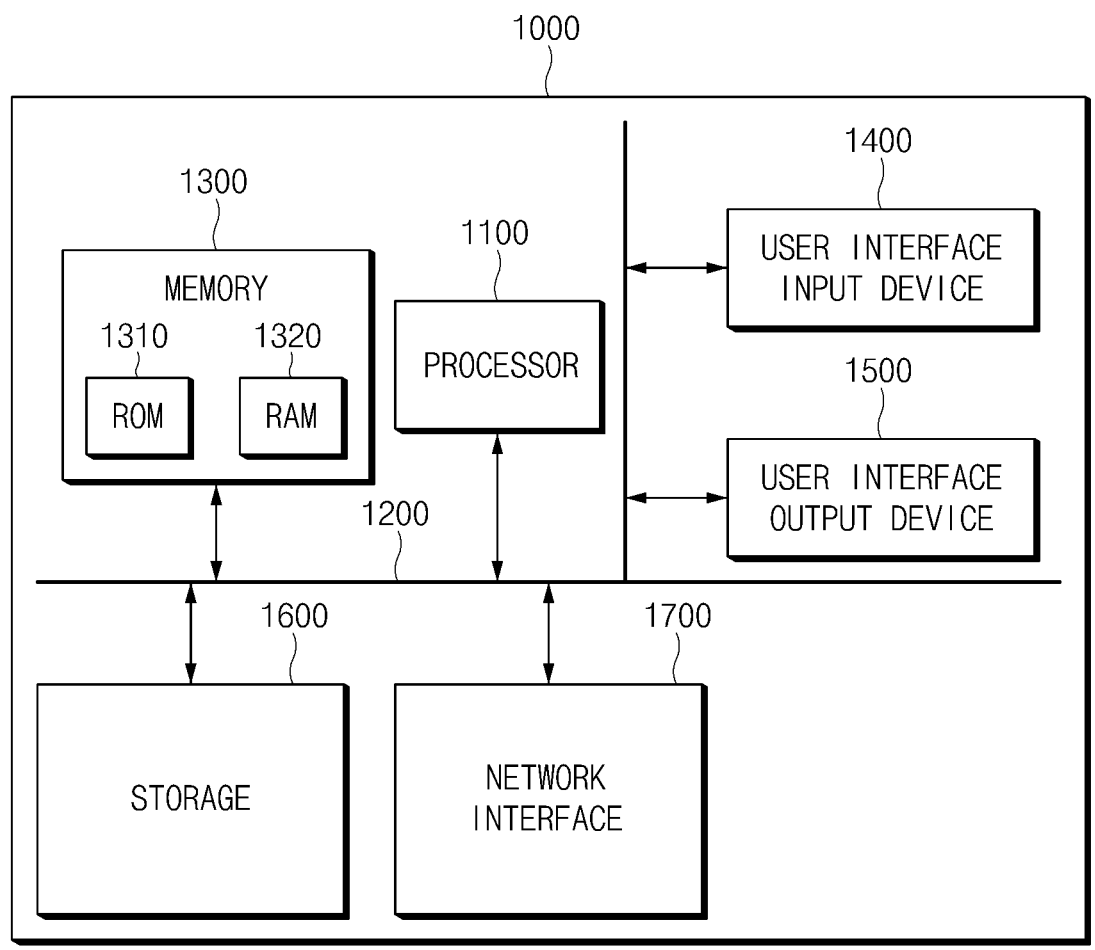
FIG. 4 is a block diagram illustrating a computer system executing a method of controlling the driving of a vehicle when battery charging is limited according to an exemplary embodiment of the present invention.

FIG. 4 is a block diagram illustrating a computer system specifically programmed to execute a method of controlling the driving of a vehicle when battery charging is limited according to an exemplary embodiment of the present invention. Referring to FIG. 4, a computing system 1000 may include at least one processor 1100, a memory 1300, a user interface input device 1400, a user interface output device 1500, a storage 1600, and a network interface 1700, which are connected to each other via a bus 1200. The processor 1100 may be a central processing unit (CPU) or a semiconductor device configured to perform processing for instructions stored in the memory device 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in connection with the exemplary embodiments disclosed herein may be embodied directly in hardware, in a software module executed by the processor 1100, or in a combination of the two. The software module may reside in a storage medium (e.g., the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), etc. An exemplary storage medium is coupled to the processor 1100 such that the processor 1100 may read information from, and write information to, the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

The present technology may prevent the operability from being deteriorated due to the engagement (lock-up) and disengagement (opening) of the engine clutch when the acceleration or deceleration of the hybrid vehicle is repeated. In addition, according to the present technology, when fuel is not injected into the vehicle, the hybrid starter generator (HSG) may be driven with the extra electric power of the motor when the engine clutch is disengaged, and the deceleration feeling or sensation of the vehicle may be implemented using a frictional loss (torque) and an engine pumping loss (torque), and thus, the injection of unnecessary fuel may be prevented, thereby improving the fuel efficiency of the vehicle.

The above-described method according to the present invention may be recorded as a computer program. A code and a code segment constituting the program may be readily inferred by a computer programmer in the field. In addition, the program may be stored in non-transitory computer-readable recording media (information storage media) and may be read and executed by a computer, thereby implementing the method of the present invention.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A method of controlling driving of a vehicle when battery charging is limited, comprising:
    calculating, by a controller, a target wheel torque from a speed of the vehicle;
    calculating, by the controller, a target motor torque from a differential gear device of the vehicle;
    calculating, by the controller, a discharge power of a hybrid starter generator when the target motor torque and a motor charging limitation torque are compared with each other and the target motor torque is greater than the motor charging limitation torque;
    blocking, by the controller, a fuel injection of the vehicle and disengaging an engine clutch when the discharge power of the hybrid starter generator and a discharging limitation power of the hybrid starter generator are compared with each other and the discharge power of the hybrid starter generator is less than the discharging limitation power of the hybrid starter generator; and
    determining, by the controller, an engine reference speed of the vehicle.

2. The method of claim 1, wherein the target wheel torque is calculated from a traveling speed of the vehicle and is a torque value requested to a target wheel.

3. The method of claim 1, wherein the calculating of the target motor torque includes:
    calculating, by the controller, a gear ratio from the differential gear device, a final gear ratio, and the target wheel torque, and multiplying the calculated gear ratio, the calculate final gear ratio, and the calculated target wheel torque.

4. The method of claim 1, wherein the motor charging limitation torque is calculated using a difference between a current motor charging limitation torque value and a preset motor charging torque reference value.

5. The method of claim 1, wherein the calculating of the discharge power includes:
    calculating, by the controller, the discharge power by subtracting vehicle electric power from a value obtained by multiplying the target motor torque, a motor speed and $2\pi/60$.

6. The method of claim 1, wherein the calculating of the discharging limitation power of the hybrid starter generator includes:
    calculating, by the controller, the discharging limitation power of the hybrid starter generator using a difference between a current value of the discharging limitation power of the hybrid starter generator and a preset reference value of the discharging limitation power of the hybrid starter generator.

7. The method of claim 1, wherein the disengaging of the engine clutch includes:
    outputting, by the controller, the discharge torque of the hybrid starter generator while disengaging the engine clutch.

8. The method of claim 7, wherein the discharge torque of the hybrid starter generator is calculated by dividing a discharge power currently output from the hybrid starter generator by a value obtained by multiplying a speed of the hybrid starter generator and $2\pi/60$.

9. The method of claim 1, wherein the engine reference speed is a speed at which the output power of the hybrid starter generator is equilibrated with an engine friction power.

10. The method of claim 1, further comprising:
    determining, by the controller, an engine compensation speed after the determining of the engine reference speed.

11. A system of controlling driving of a vehicle when battery charging is limited, comprising:
    a memory configured to store program instructions; and
    a processor configured to execute the program instructions, the program instructions when executed configured to:
    calculate a target wheel torque from a speed of the vehicle;
    calculate a target motor torque from a differential gear device of the vehicle;
    calculate a discharge power of a hybrid starter generator when the target motor torque and a motor charging limitation torque are compared with each other and the target motor torque is greater than the motor charging limitation torque;
    block a fuel injection of the vehicle and disengage an engine clutch when the discharge power of the hybrid starter generator and a discharging limitation power of the hybrid starter generator are compared with each other and the discharge power of the hybrid starter generator is less than the discharging limitation power of the hybrid starter generator; and
    determine an engine reference speed of the vehicle.

12. The system of claim 11, wherein the target wheel torque is calculated from a traveling speed of the vehicle and is a torque value requested to a target wheel.

13. The system of claim 11, wherein the program instructions when are further configured to:
    calculate a gear ratio from the differential gear device, a final gear ratio, and the target wheel torque, and multiple the calculated gear ratio, the calculate final gear ratio, and the calculated target wheel torque.

14. The system of claim 1, wherein the motor charging limitation torque is calculated using a difference between a current motor charging limitation torque value and a preset motor charging torque reference value.

15. The system of claim 11, wherein the program instructions when are further configured to:
    calculate the discharge power by subtracting vehicle electric power from a value obtained by multiplying the target motor torque, a motor speed and $2\pi/60$.

16. The system of claim 11, wherein the program instructions when are further configured to:
    calculate the discharging limitation power of the hybrid starter generator using a difference between a current value of the discharging limitation power of the hybrid starter generator and a preset reference value of the discharging limitation power of the hybrid starter generator.

17. The system of claim 11, wherein the program instructions when are further configured to:

output the discharge torque of the hybrid starter generator while disengaging the engine clutch.

18. The system of claim 17, wherein the discharge torque of the hybrid starter generator is calculated by dividing a discharge power currently output from the hybrid starter generator by a value obtained by multiplying a speed of the hybrid starter generator and $2\pi/60$.

19. The system of claim 11, wherein the engine reference speed is a speed at which the output power of the hybrid starter generator is equilibrated with an engine friction power.

20. The system of claim 11, wherein the program instructions when are further configured to:

determine an engine compensation speed after the determining of the engine reference speed.

* * * * *